Patented Aug. 7, 1934

1,969,272

UNITED STATES PATENT OFFICE 1,969,272

LINOLEUM AND ITS MANUFACTURE

Abraham B. Miller, Lancaster, Pa., assignor to Armstrong Cork Company, Lancaster, Pa., a corporation of Pennsylvania No Drawing. Application April 5, 1932, Serial No. 603,439

21 Claims. (Cl. 87—17)

This invention relates to linoleum and its manufacture and more especially to the preparation of the cement or binder used in the linoleum.

Linoleum consists of a suitable filler or fillers held together by a binder or cement. The usual fillers are ground cork, wood flour, color pigments and various mineral fillers, such as whiting. Usually either ground cork or wood flour or both, together with some mineral filler and pigment are used. The amount of filler usually represents from 50 to 75% by weight of the mass depending upon the color of the material and the type of cement used.

The originally developed and most usual binder is a cement made from oxidized linseed oil and resin. In more recent years, other oils have been partially or wholly substituted for linseed oil, such as menhaden or fish oil. In preparing the cement or binder, the oil is given an oxidizing treatment, either by periodically running it over long hanging strips of fabric, such as scrim, upon which a film of the oil is formed and oxidized by exposure to the air in moderately heated sheds or by placing the oil together with driers, such as litharge and manganese resinate in a heated vessel and agitating while air is blown through the mass. This latter process is known as "mechanical oxidizing" and the former is termed "shed oxidizing".

In the manufacture of cement from mechanical and shed oil, a suitable resin, such as rosin or kauri gum, is heated in a kettle and liquefied, and to this is added the oxidized oil. The mass is then masticated and thoroughly mixed, forming the linoleum cement or binder. In some cases, a mixture of both shed and mechanically oxidized oils is used in making the cement.

In both shed and mechanically oxidized oil, there remains a considerable proportion of unoxidized oil in the cement. This results in prolonged stoving time and "soft center". By "soft center" is meant the existence, in the middle of the layer of linoleum composition, of a relatively soft stratum.

In recent years, a process has been developed whereby the above disadvantages may be overcome and a cement produced which contains a very minor proportion of unoxidized oil. According to this process, an anti-coagulant or peptizer, which is preferably a resin of the cement, is combined with the oil prior to or during the oxidation of the oil. The oil is preferably oxidized in the usual Bedford beater or mechanical oxidizer. The resin, acting as an anti-coagulant, keeps the oil sufficiently liquid so that oxidation can be carried to the point of substantially oxidizing the unsaturated components of the oil. The oil, combined with the resin, may be used as a linoleum cement in the form from which it comes from the oxidizing beater, thus enabling the cement to be made in a single operation. For convenience, I will designate this cement as "mechanical cement" by analogy to mechanical oil.

In the manufacture of linoleum, the cement is mixed with the fillers and pigments and each particle is thoroughly coated with the cement. This mass is then formed by calendering, stenciling and pressing, or otherwise, to form the desired final product. In some cases, a backing, such as burlap, canvas or saturated felt is used and in other instances the sheets are formed without a backing and are subsequently cut into individual tiles. The material is then placed in heated chambers and cured, after which it is trimmed and packed for market.

In the manufacture of linoleum, there has always been the problem of re-utilizing scrap material. This problem has become more acute since the introduction of the rotary type of inlaying machine. In the manufacture of linoleum on the rotary machine, webs of linoleum composition are fed to the die rolls which cut the web into pieces. The pieces thus cut are retained in the die cavities between the cutting knives and the periphery of the die rolls until ejected by the actuation of strippers. The desired pieces of the proper color are applied to the backing by the strippers; the remaining linoleum composition being ejected into conveyors which carry the material to scrap deposit stations. The several webs of color are each of an area corresponding to the area of the finished goods. Consequently, there is discharged as scrap a volume of linoleum mix equal to the full thickness of a web times the area of the goods times one less than the number of webs employed. For example, in a pattern which utilizes four color webs, the scrap amounts to three times the area of the finished product.

When plain colored patterns are being produced, the rejected blocks of each individual color are kept separate and are remixed with added cement and fillers, resheeted and again fed to the dies. The tendency at the present time, however, is toward patterns made up of marbleized or striated pattern elements in which two or more colors are intermixed and calendered to form a striated base web.

The rejected striated blocks embodying two or more variegated colors cannot be conveniently remixed to produce a new striated sheet having a standardized and uniform graining corresponding to the original base web. The variegated reject blocks, when ground up for re-use, become a relatively uniform colored mixture and a satisfactory variegated effect is not obtained. The usual practice in the art is to burn much of this scrap material. Some minor portions are re-used in the production of plain dark colors by the addition of pigments and cement to the scrap. This requires the use of large amounts of expensive pigments and an inferior product is produced.

It has also been proposed to carefully choose the color elements making up the striated web so that, with the addition of minor amounts of pigments, a mix can be produced having a color corresponding to one of the colors of the striated base web. This, of course, imposes grave limitations upon the designer and the amount of scrap which can be re-used by this process is not sufficient to warrant this limitation of patterns.

As a consequence, the linoleum manufacturer is faced with the problem of disposing of tons of scrap linoleum composition, both relatively fresh rejected blocks and also selvage trimmings, and inferior and damaged cured sheets.

Considerable experimentation has been carried on both in the United States and Germany in an effort to devise some means whereby scrap may be commercially utilized. It has been proposed to dissolve out the binder by the use of volatile organic solvents with which the linoleum composition is mixed under heat and pressure. The solution thus obtained is then separated from the fillers by filtration and the dissolving agent distilled off. It is proposed to use the oil which is obtained as a dressing or glazing agent or varnish. This process is not commercially practicable. The solvents are relatively costly and the product obtained has little or no commercial value.

I have found that a satisfactory linoleum cement can be produced by utilizing the oxidized oil cement of scrap linoleum composition in combination with resins under certain conditions. The scrap linoleum composition may be either fresh or cured. My process may be advantageously applied to the production of a mechanically oxidized cement although the process is not limited to such a cement; it may be utilized in the production of mechanical oil cement.

The invention will be described with particular reference to the use of linseed oil, but it will be understood that other oils may be wholly or partially substituted for linseed oil as is well understood in linoleum cement preparation.

To a charge consisting of about 100 parts by weight of relatively fresh scrap linoleum composition is added about 50 parts by weight of a suitable solvent resin. This mixture is placed in a vessel capable of heating the charge and provided with a stirring mechanism. The heating is continued until a temperature of somewhere between 100° and 200° C. is obtained. Agitation proceeds with the heating so that the scrap material is thoroughly acted upon by the resin. I have found that rosin forms a highly desirable solvent resin and when rosin is used, the temperature obtained is preferably about 180° C. I have found also that heating may be effected either externally or by the injection of hot gases into the mass.

The resin mingles with the oxidized cement of the scrap composition and acts, under the conditions of heat and agitation, to lower the melting point of the cement and separate it from the particles of filler material. A relatively stiff, stringy and somewhat tenacious mass is obtained.

In order to remove the fillers from the recovered cement, about 150 parts by weight of raw linseed oil is added to the charge stipulated above, and heating and agitation are continued until a fluid, filterable mass is obtained. If the mass is permitted to cool, the liquefied cement tends to solidify and precipitation results. In order to effect a ready separation of the fillers and binder, I introduce the charge, while hot, into a suitable mechanical separator, such as a centrifuge, a hot filter press, or a vacuum filter. A somewhat higher yield of binder material is obtained if the filtration is carried out hot because of the avoidance of precipitation above mentioned. I am able to recover substantially all of the linseed oil binder of the linoleum composition from the fillers and pigments.

It will be understood that in working with fresh linoleum scrap, the application of heat may cause charring of the mass and decomposition of the binder if carried to excess or the continued application of heat will convert the oxidized oil cement to gel form. If there is such a conversion prior to the addition of the fluxing resin and oil, the situation will be somewhat similar to the conditions surrounding the recovery of oxidized oil cements which have been cured or matured. Where heat conversion has taken place, a greater proportion of fluxing materials is required. The process is performed with greatest facility on unmatured linoleum scrap, although its utility is none the less important on matured linoleum scrap for the reason that matured binders have heretofore been regarded as irrecoverable, except by saponification methods.

Reverting to the example given above, the filtrate will contain substantially 50 parts rosin, 50 parts reclaimed cement (assuming the original linoleum composition contains 50% fillers and 50% cement), and 150 parts of raw linseed oil, or stated in terms of the three important constituents, 20% rosin, 20% reclaimed cement and 60% oil.

The amount of raw linseed oil added to facilitate filtration is advantageously adjusted with respect to the rosin used as a fluxing agent so that the proportion of rosin to oil in the resulting mixture is substantially in the proportion found in a rosin-oil cement. Only sufficient oil to facilitate filtration need be added. If sufficient oil be added to combine with the fluxing resin in the proportion used in the formation of cement, the filtrate will be more easily handled than otherwise, inasmuch as it will be hot and thoroughly mixed and can be immediately put into an oxidizer to form a linoleum cement. In the example given above, the ratio of oil to rosin is 3 to 1, all proportions herein being by weight.

The example given may be varied considerably without departing from the essential thought. If desired, other resins, such as ethyl abietate, which is a soft, balsam-like material, cumar, which is somewhat harder, "Amberol", which is a hard thermoplastic rosin or ester gum modified phenol-formaldehyde type resin or other synthetic or natural resin may be employed. The fluxing resin employed will, in all cases, be a material which is effective for fluxing or dissolving out the oil binder, and may form a desirable constituent of the linoleum cement prepared from the reclaimed material. Other drying or semi-drying oils may be used in place of linseed oil, care being taken to select an oil which is compatible with the resin employed and which is compatible with the original cement to form a desirable finished product. In the example given above, the added oil was the same as the oil originally used in the cement to be reclaimed, and the oil was added in the correct proportions to combine with the fluxing rosin to form a rosin-oil cement having the same proportions as the reclaimed cement so that upon oxidation a homogeneous, uniform cement is obtained.

If desired, the reclaimed cement may be removed from the rosin-oil-reclaimed cement mixture, but I prefer to add litharge or manganese resinate up to the metallic content of about 2% of the weight of the added oil and subject the mixture to oxidation in a mechanical oxidizer, forming a cement.

As a continuous operation, the rosin-oil-cement mixture may be conveniently divided into two parts, one of which is used in the formation of cement and the other of which is used as a fluxing agent for more scrap linoleum composition. As an example, I may take 100 parts by weight of fresh scrap linoleum composition and add thereto 100 parts by weight of the rosin-oil-cement mixture and heat the combination, reducing the binder of the scrap to a liquid condition. I then add 100 parts by weight of a rosin and oil mixture, the mixture being in the proportion of 3 parts of oil to 1 part of rosin, and thereafter filter. If desired, raw oil may be added before filtration and the rosin added subsequently. It is also possible to use an additional 100 parts by weight of rosin-oil-cement solution in place of the rosin-oil mixture. One-half of the filtrate may be oxidized to form a cement and the other half utilized as the reducing or fluxing agent for more scrap. It will be noted in the above examples that the ratio of rosin to oil remains about 3 parts of oil to 1 part of rosin, both in the finished cement and in the rosin-oil-cement mixture.

If desired, the filtrate may be cooled in order to effect separation of the reclaimed cement and the fluxing material. The oil, the rosin and the reclaimed cement will be present throughout the mixture, but a greater proportion of the reclaimed cement will precipitate to the bottom of the mixture upon cooling. The top portion of the mixture may be drawn off and used as a fluxing agent for reclaiming additional binder and the remaining portion may be oxidized to form a cement.

I have found that the solutions which contain some oxidized oil are better solvents or fluxing agents for oxidized oil binders than those which do not. If raw oil is added before fluxing, the reduction or fluxing of the binder does not proceed so completely. Many tests are entirely negative and I recommend that raw oil be added only after fluxing has been accomplished or substantially completed. Oxidized oil may be present, however, before fluxing begins. If there is a large proportion of unoxidized oil present as compared to the proportion of oxidized oil, fluxing may proceed, as will be seen by reference to the above examples where a portion of the reclaimed mixture is used as a fluxing agent.

A variation of the process may be practiced in those cases where it is not desired to have a mixture of rosin and oil for oxidation after extraction of the cement from the scrap composition. In such cases, rosin, or other suitable resin, is used as a fluxing agent in conjunction with heat and agitation. The mixture may be thinned for purposes of separation or filtration by use of a solvent for the resin-cement mixture, such, for example, as alcohol. The thinned mixture is mechanically separated into liquid and filler constituents and the liquid portion may be further separated by cooling to effect precipitation of the reclaimed binder after which the liquid portion on top may be drawn off for further use as a reduction or fluxing agent. Prior to its use as a reduction material, the alcohol is separated from the rosin in order that the rosin may be used as a fluxing agent as specified before.

The fillers and pigments removed by filtration from the reclaimed scrap contain a small proportion of the rosin-oil-cement mixture. These constituents may be used with the addition of oil for the formation of a paint, such, for example, as the backing paint usually applied to burlap, canvas or saturated felt for use as a backing for linoleum. The fillers and pigments are usually in the form of a cake and it is desirable to soften this cake by soaking in oil. If ordinary backing paint is desired, a boiled oil will be used and after soaking and softening, the mixture will be ground to the requisite fineness. This use of the fillers and pigments reclaimed from the scrap eliminates any waste in the operation of the process.

As stated above, the preferred procedure has been described in connection with relatively fresh linoleum scrap, but the process is applicable to cured linoleum as well. In treating cured linoleum scrap for reclaiming the binder by the above process, it is desirable to first soften it somewhat by slightly moistening with or exposing to the fumes of a suitable solvent, such as benzol. The material may also be softened by milling or by a combination of solvent action and mechanical working. This softening somewhat facilitates the reduction or fluxing of the cement into liquid form. If the material is not preliminarily softened, a higher proportion of resin to reclaimed cement should obtain in the fluxing operation because of the slower action of the fluxing resin on the harder cement gel.

Although I have described my process specifically in connection with linseed oil cements, it will be understood that other siccative oils may be employed, such, for example, as menhaden or fish oil, tung or China wood oil, soya bean oil, etc. By the term "siccative oil" I intend to include not only the so-called drying oils, such as linseed oil and tung oil, but also semi-drying oils, such as menhaden oil and the like. Rosin is the preferred fluxing agent on account of its cheapness and its desirability as a constituent of linoleum cement, but other resins effective for fluxing the gelled oil binders may be as advantageously employed if they are to appear as constituents in the finished cement.

I have described the formation of linoleum cement by mechanical oxidizing rather than shed oxidizing because of the high rosin content of the resin-oil-cement mixture. The presence of a large percentage of rosin tends to prolong the shed oxidizing process to a point where it is not commercially attractive.

While I have described certain specific preferred embodiments of my invention, it will be understood that the invention is not limited to the specific examples but may be otherwise embodied and practiced within the scope of the following claims.

I claim:

1. In the process of making a siccative oil binder, the step consisting in fluxing a gelled binder comprising an oxidized siccative oil and a resin with a compatible fluxing resin.

2. In the process of making a siccative oil binder, the steps consisting in subjecting a gelled binder comprising an oxidized siccative oil and a resin to the action of a fluxing resin under heat, adding a siccative oil and thereafter oxidizing the resulting mixture.

3. In the process of making a siccative oil-containing binder, the steps consisting in fluxing a previously oxidized and gelled siccative oil and resin mixture with a solvent resin under heat, adding a siccative oil in binder forming proportions with respect to the fluxing resin and oxidizing the mixture.

4. In the process of making a siccative oil binder, the steps consisting in subjecting a mass comprising filler particles held together with a gelled binder comprising an oxidized siccative oil and a resin to the action of a fluxing resin under heat, diluting to facilitate separation of the liquid and solid constituents and separating the liquid and solid constituents.

5. In the process of making a siccative oil binder, the steps consisting in subjecting comminuted linoleum scrap to a resin which fluxes the binder in the scrap, adding a raw siccative oil and oxidizing the oil and resin mixture.

6. In the process of making a siccative oil binder, the steps consisting in subjecting linoleum composition to the action of a fluxing resin under heat, separating the liquid and solid constituents and then removing the fluxing agent.

7. In the process of making a siccative oil binder, the steps consisting in subjecting linoleum composition to the action of a fluxing resin under heat and agitation, diluting the mixture with a compatible siccative oil, removing the solid constituents and oxidizing the resulting mixture.

8. In the process of making a siccative oil binder, the step consisting in subjecting a previously oxidized and gelled siccative oil and rosin binder to the fluxing action of hot rosin.

9. In the process of making a siccative oil binder, the step consisting in subjecting comminuted linoleum composition containing fillers and a binder comprising oxidized linseed oil and rosin to the fluxing action of rosin.

10. In the process of making a siccative oil binder, the step consisting in subjecting an oxidized and gelled siccative oil and resin to the action of a heated mixture comprising a fluxing resin and a degelled siccative oil.

11. In the process of making a siccative oil binder, the step consisting in subjecting an oxidized and gelled siccative oil and resin to the action of an oxidized siccative oil under heat.

12. In the process of making a siccative oil binder, the steps consisting in subjecting linoleum composition to the action of a heated mixture of a fluxing resin, a raw siccative oil, and a degelled siccative oil binder, removing the solid constituents and oxidizing the remaining mixture.

13. In the process of making linoleum cement, the step consisting in subjecting linoleum composition to a fluxing resin under heat.

14. In the process of making linoleum cement, the step consisting in subjecting linoleum composition to the action of an oxidized siccative oil under heat.

15. In the process of making linoleum cement, the step consisting in subjecting linoleum composition to the action of a degelled linoleum binder and a compatible fluxing resin.

16. In the process of reclaiming oil-resin cement from plastic compositions, the steps consisting in comminuting the cement-containing composition, extracting the cement with a heated compatible fluxing resin, diluting the mixture sufficiently to permit separation of the filler and binder constituents and separating the fluxed binder from the mass.

17. In the process of reclaiming oil-resin cement from plastic compositions, the steps consisting in comminuting the cement-containing composition, extracting the cement with a heated compatible fluxing resin, diluting the mixture with sufficient binder forming constituent to permit separation of the filler and binder constituents and separating the fluxed binder and binder forming constituent from the mass.

18. In the process of making linoleum cement the steps consisting in subjecting scrap linoleum composition to a preliminary softening treatment and fluxing with a solvent resin under heat.

19. In the process of making linoleum cement, the steps consisting in mechanically softening scrap linoleum composition, subjecting the softened composition to the action of a fluxing resin under heat, adding a compatible siccative oil, removing the solid constituents and oxidizing the remaining mixture.

20. In the process of making linoleum cement, the steps consisting in comminuting linoleum composition containing fillers and a gelled and oxidized siccative oil-resin binder, heating such composition with a fluxing resin, adding sufficient siccative oil to produce an oil resin mixture of substantially three parts of oil to one of fluxing resin, removing the solid constituents and oxidizing the resulting mixture.

21. In the process of making linoleum cement, the steps consisting in subjecting unmatured linoleum composition to the fluxing action of hot rosin with agitation, adding a siccative oil in sufficient amount to form a binder upon oxidation with the fluxing rosin whereby the mixture is diluted, separating the binder and filler constituents and oxidizing the binder constituents.

ABRAHAM B. MILLER.